United States Patent [19]

Strubbe et al.

[11] Patent Number: 4,959,719
[45] Date of Patent: Sep. 25, 1990

[54] PICTURE-IN-PICTURE TELEVISION RECEIVER CONTROL

[75] Inventors: Hugo J. Strubbe, Yorktown Heights, N.Y.; Donald R. Gentner, Palo Alto, Calif.

[73] Assignee: North American Philips Corporation, New York, N.Y.

[21] Appl. No.: 288,546

[22] Filed: Dec. 21, 1988

[51] Int. Cl.⁵ .......................................... H04N 5/262
[52] U.S. Cl. .................................. 358/183; 358/192.1
[58] Field of Search ...................... 358/183, 192.1, 22

[56] References Cited

U.S. PATENT DOCUMENTS

| | | | |
|---|---|---|---|
| 4,620,229 | 10/1986 | Amano et al. ................ | 358/183 X |
| 4,725,888 | 2/1988 | Hakamada ........................ | 358/183 |
| 4,729,027 | 3/1988 | Hakamada et al. ................ | 358/183 |
| 4,746,983 | 4/1988 | Hakamada ........................ | 358/183 |
| 4,761,688 | 8/1988 | Hakamada ........................ | 358/183 |
| 4,774,582 | 9/1988 | Hakamada et al. ................ | 358/183 |
| 4,777,531 | 10/1988 | Hakamada et al. ................ | 358/183 |
| 4,821,102 | 4/1989 | Ichikawa et al. ................ | 358/183 |
| 4,845,564 | 7/1989 | Hakamada et al. ................ | 358/183 |

*Primary Examiner*—James J. Groody
*Assistant Examiner*—Mark R. Powell
*Attorney, Agent, or Firm*—Robert T. Mayer

[57] ABSTRACT

A television system with picture-in-picture capability in which a common control element can be used to control both the main picture and the picture-in-picture on the screen together with an indicating means displayable on the screens indicate which picture the common control element is capable of controlling at any time.

19 Claims, 1 Drawing Sheet

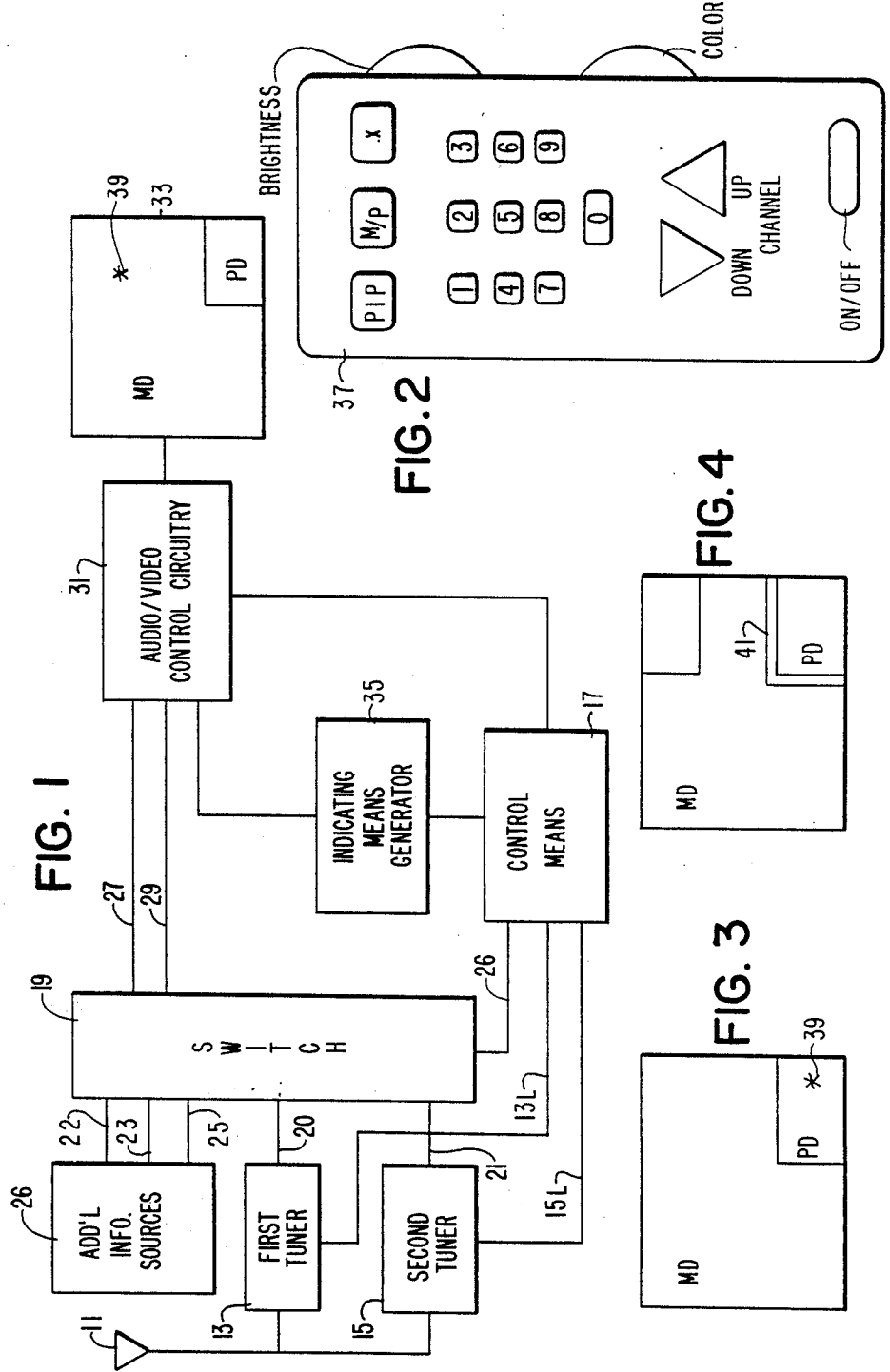

PICTURE-IN-PICTURE TELEVISION RECEIVER CONTROL

This is an invention in television. More particularly, it is an arrangement for making it easier to use a picture-in-picture television receiver.

Picture-in-picture television receivers have been known for a number of years. One such receiver is disclosed in U.S. Pat. No. 4,665,438 to Miron et al entitled "Picture-in-Picture Color Television Receiver" which is assigned to the assignee of this application.

One of the characteristics of picture-in-picture television receivers in the past was that the controls were unduly complicated if a viewer were to be given the same control over the picture-in-picture display as he could exercise over the main picture. Somewhat simpler controls have been proposed but with such controls the viewer does not have the same control over the picture-in-picture display as he has over the main picture. One example of such simpler controls is an arrangement which allows a viewer to change the main picture from any channel to any other channel in one tuning step but permits the picture-in-picture channel to be changed only by a tune up or tune down button which means any number of channels might have to be gone through to get the picture-in-picture display from one channel to another.

It is an object of this invention to make it easier for a viewer to control a picture-in-picture television receiver.

One of the advantages of the invention is that the same user operated controls are used to control both the main picture and the picture-in-picture display.

One of the features of the invention is the provision of an indicating means on the television screen to indicate which picture the controls have control over at any particular time.

In accordance with one aspect of the invention there is provided in combination with a picture-in-picture television receiver including a display means with a screen capable of displaying a main picture and at least one picture-in-picture, a plurality of sources of information. The information is for display as the main picture and the at least one picture-in-picture. There is also provided manually operable common control means for switching the main picture from one of the sources of information it is capable of displaying to another such source or for switching a predetermined one of the at least one picture-in-picture from one of the sources of information which it is capable of displaying to another such source. A selection means is provided for selecting whether the control means switches the main picture or the predetermined one of the at least one picture-in-picture between sources of information in response to manual operation. An indicating means generator responds to the selection means causing the display means to display on the screen indicating means indicating which of the pictures the control means will switch between sources of information upon manual operation to cause such switching.

In accordance with another aspect of the invention there is provided a television system having a receiver capable of receiving a predetermined number of channels. The system also has display means with a screen capable of providing a picture-in-picture display whereby the display means displays a main picture of information received from a first channel being received by said receiver and whereby the display means displays a smaller picture than the main picture of information received from a second channel being received by the television receiver. The system includes first tuner means for switching the main picture from the first channel to any other of the predetermined number of channels received by the television receiver. The system also includes second tuner means capable of switching the smaller picture from the second channel to any other of the predetermined number of channels received by the television receiver. The system includes a common control means for enabling either the first tuner means or the second tuner means to switch channels. Also provided are manual selection means for selecting which of the tuner means the control means will enable. The receiver also includes an indicating means generator which is enabled by the control means to cause the display means to display on the screen indicating means indicating which of the tuner means is enabled.

Other objects, features and advantages of the invention will become apparent to those skilled in the art upon considering the following description when taken in conjunction with the appended claims and the accompanying drawing, in which:

FIG. 1 is a simplified block diagram schematic of a picture-in-picture television receiver including the invention of this application;

FIG. 2 is a representation of a remote control unit for use with the invention;

FIG. 3 is a representation of the screen of the television receiver of FIG. 1 with a display different from that of FIG. 1; and FIG. 4 is a representation of the screen of the television receiver of FIG. 1 with a still different display than either that of FIG. 1 or FIG. 3.

Referring to FIG. 1 there is shown therein a simplified block diagram useful for illustrating the invention. It is to be understood that an up-to-date design for a picture-in-picture television receiver would probably include microprocessor controlled equipment. From the following description anyone skilled in the television art will understand how to practice the invention with such a microprocessor controlled television receiver.

Shown in FIG. 1 is antenna 11 connected to first tuner means 13 and second tuner means 15. Tuners 13 and 15 are connected to common control means 17 to receive input signals therefrom along lines 13L and 15L. Their outputs are connected to switch 19 by lines 20 and 21. Switch 19 has a plurality of additional inputs 22, 23 and 25 for receiving inputs from additional information sources 26, which may take the form of video cassette recorders video disc players cable television systems, etc. and may produce traditional video, alpha-numeric data or other information for display.

Control means 17 applies an input signal to switch 19 along line 26 to control which signal along lines 20, 21, 22, 23 or 25 switch 19 will apply along lines 27 and 29 to audio/video control circuitry 31. As those skilled in the art will understand, such control circuitry includes for example, main picture audio and video I.F. stages, picture-in-picture video I.F. stages, detector stages, mixer circuitry, output amplifiers and all of the other circuitry for a picture-in-picture television receiver. Circuitry 31 is connected to display 33 to cause it to display the main picture MD and the picture-in-picture display PD.

Control means 17 is also connected to audio/video control circuitry 31 for supplying signals thereto which, as will be explained, could be used to control which picture is displayed in the main display and which is displayed in the picture-in-picture display. Control means 17 is also connected to indicating means generator 35 for transmitting signals thereto to cause the audio/video control circuitry to produce an indicating means symbol in either the main picture or the picture-in-picture.

In the presently preferred embodiment, common control means 17 would include remote control transmitter 37, shown in FIG. 2, together with a receiver in the picture-in-picture television set for receiving signals generated by remote control transmitter 37.

Remote control transmitter 37 includes an on/off button which turns the set on and causes control means 17 to transmit a signal to first tuner 13 to have it produce an input to switch 19 from the channel selected by tuner 13. Transmitter 37 also includes a PIP button which causes control means 17 to transmit a signal to second tuner 15 to produce an input to switch 19 from the channel selected by tuner 15. Numerical buttons 0-9 are used to select channels for the main picture display MD and the picture-in-picture display PD by channel number. The UP/DOWN buttons are used to change the tuners, one channel at a time either in the up direction or the down direction.

The X button is used to swap the channels being displayed by the main picture and the picture-in-picture display. In this respect, when the X button is pressed, the channel displayed in the main picture display becomes displayed in the picture-in-picture display and that which was displayed in the picture-in-picture display becomes the main picture. This can be done in either of two alternative ways. Assuming a picture is displayed in both displays, circuitry 31 could be caused to operate by a signal from control means 17 to switch the displays. Alternately, switch 19 could be caused to operate to switch the outputs on lines 27 and 29 from tuners 13 and 15. As is evident tuners 13 and 15 need not be dedicated to a particular display.

The M/P button enables control means 17 to select which tuner the remote will control in response to the operation of the 0-9 buttons and the UP/DOWN buttons.

An exemplary operation of the invention will be described in which it is assumed that the apparatus is displaying a channel received by first tuner 13 and another channel received by second tuner 15. It is also assumed that the M/P button is in the condition which causes the channel in the main picture display to change in response to the operation of the remote. As a result control means 17 causes indicating means 35 and audio/video control circuitry 31 to cause the main picture to display an indicating means in the form of asterisk 39 in the main picture in accordance with the signal transmitted by indicating means generator 35. This indicates to a viewer that the remote control buttons 014 9 and the UP/DOWN buttons control channel changing of the main picture MD.

If, under the above circumstances a viewer wishes to use the remote control transmitter 37 to change the channel on the picture-in-picture display PD, he need only press the M/P button which thereupon causes audio/video control circuitry 31 to place asterisk 39 in the picture-in-picture display as shown in FIG. 3. At the same time, it causes control means 17 to disable control of channel changing of the main display and to enable control of channel changing of the picture-in-picture display.

An asterisk has been shown as the indicating means in FIGS. 1 and 3. However, this was only shown as a convenience in disclosing the invention. It is presently contemplated that a more desirable indicating means would employ an enhanced border along the left edge and upper edge of the picture-in-picture display when control of the channels in the picture-in-picture display exists. In color television sets, it is contemplated that this could be a yellow colored border. Such a border is illustrated in FIG. 4 by the border 41 in FIG. 4, which distinguishes from the thinner lines designating such borders in FIGS. 1 and 3. It is to be understood that if such a border were shown, the asterisk shown in FIGS. 1 and 3 would not be necessary. When channel control of the main picture exists the border for the picture-in-picture display would not be enhanced.

It is also contemplated that when a border such as 41 is used, instructions for telling a viewer which picture is under control of the remote transmitter could be written in the border. The use of a border 41 also affords one the capability of changing the borders color to distinguish which picture is under control of the remote.

It is recognized that the use of the indicating means such as asterisk 35 would not be necessary in the main picture MD when the remote controller is enabled to control the main picture. The absence of the indicating means from the picture-in-picture display PD under such circumstances would be sufficient to inform a viewer which picture the remote control was then controlling. Alternatively, the indicating means could be used in the main picture and not in the picture-in-picture display PD. Under these circumstances, the absence of an indicating means would thereby indicate that the remote control was in control of the picture-in-picture display PD. The presence of the indicating means in the main picture would indicate that the remote control would be controlling the main picture.

It is to be understood that more than one picture-in-picture display could be produced, such as shown in FIG. 4, with one in the upper right hand corner and one in the lower right hand corner without departing from the invention. In these circumstances additional PIP buttons could be provided and button M/P could be made to control a switch with as many outputs as pictures to be controlled. Selection could be performed in a predetermined manner, for example by rotation through the pictures. If the main picture was selected with a television with two picture-in-picture displays the next operation of the M/P button would select one of the picture-in-picture displays, the next operation of the button would select the other picture-in-picture display and the next operation would return selection to the main picture.

It is also to be understood that if additional information sources were connected to inputs 22, 23 and/or 25, additional switches could be provided on remote control transmitter 37 and that control means 17 could be adapted accordingly to control switch 19 so that the signals from these external sources could be displayed in either the main picture display or a picture-in-picture display. Alternatively, reserved channel numbers, such as 91, 92, 93, etc. could be used whereupon should a viewer input any one of these numbers control means 17 could cause switch 19 to connect the number's associated additional information source in place of the source that had been selected by button M/P to provide the selected picture so that the information from the associated information source could be displayed.

The invention is capable of being used to indicate that any feature of a picture on the screen may be controlled by the manual control means. Thus upon the selection of a particular picture by operation of the M/P button, for example, brightness and/or color could be changed by operation of the appropriate switch on the remote.

Various modifications to the above described arrangement of the invention will become evident to those skilled in the art. As a result, the arrangement described herein is for illustrative purposes and is not to be considered restrictive.

What is claimed is:

1. In combination with a picture-in-picture television receiver including a display means with a screen capable of displaying a main picture and at least one picture-in-picture, a plurality of sources of information for display as said main picture and said at least one picture-in-picture, a single manually operable control means for switching said main picture from one of said sources of information which is capable of displaying to another such source and for switching said at least one picture-in-picture from one of said sources of information which it is capable of displaying to another such source, selection means for selecting whether said control means switches said main picture or said predetermined one of said at least one picture-in-picture between sources of information in response to manual operation and an indicating means generator responsive to said selection means causing said display means to display on said screen indicating means indicating which of said pictures said control means will switch between sources of information upon manual operation to cause such switching.

2. In combination with a picture-in-picture television receiver as claimed in claim 1, wherein said indicating means is an image associated with said predetermined one of said at least one picture-in-picture when, said selection means is operated to select said predetermined one for said control means to switch between sources of information.

3. In combination with a picture-in-picture television receiver as claimed in claim 1, wherein said indicating means is an image associated with said main picture when said selection means is operated to select said main picture for said control means to switch between sources of information.

4. In combination with a picture-in-picture television receiver as claimed in claim 2, wherein said indicating means is an image associated with said main picture when said selection means is operated to select said main picture for said control means to switch between sources of information.

5. In combination with a picture-in-picture television receiver as claimed in claim 2, wherein said indicating means is a border on at least part of the edge of said picture-in-picture.

6. In combination with a picture-in-picture television receiver as claimed in claim 5, wherein said border is on the top and left side edges of said picture-in-picture.

7. In combination with a picture-in-picture television receiver as claimed in claim 6, wherein said indicating means is an image associated with said main picture when said selection means is operated to select said main picture for said control means to switch between sources of information.

8. A television system having a receiver capable of receiving a plurality of channels and having display means with a screen capable of providing a picture-in-picture display whereby the display means displays a main picture of information received from a first channel being received by said television receiver and whereby the display means displays a smaller picture than the main picture of information received from a second channel being received by said television receiver; first tuner means for switching said main picture from said first channel to any other of said plurality of channels received by said television receiver; second tuner means for switching said smaller picture from said second channel to any other of said plurality of channels received by said television receiver; common control means for enabling either said first tuner means to operate to switch channels or said second tuner means to switch channels; manual selection means for selecting which of the tuner means said control means will enable; and an indicating means generator being enabled by said control means to cause said display means to display indicating means on said screen indicating which of said tuner means is enabled.

9. A television system according to claim 8, wherein said indicating means is an image associated with said smaller picture when said tuning control means is in position to control said second tuner means.

10. A television system according to claim 9, wherein said indicating means is an image associated with said main picture when said tuning control means is in the position to control said first tuner means.

11. A television system in accordance with claim 8, wherein said indicating means is a border on at least part of the edge of said smaller picture.

12. A television system in accordance with claim 11, wherein said border is on the top and left side edges of said smaller picture.

13. In combination with a picture-in-picture television receiver including a display means with a screen capable of displaying a main picture and at least one picture-in-picture, a plurality of sources of information for display as said main picture and said at least one picture-in-picture, a single manually operable control means for controlling at least one feature of said main picture and for controlling at least one feature of said at least one picture-in-picture, selection means for selecting whether said control means controls said at least one feature of said main picture or said at least one feature of said at least one picture-in-picture in response to manual operation and an indicating means generator responsive to said selection means causing said display means to display on said screen indicating means indicating which of said pictures said control means will control upon manual operation.

14. In combination with a picture-in-picture television receiver as claimed in claim 13, wherein said indicating means is an image associated with said one picture-in-picture of said at least one picture-in-picture when said selection means is operated to select said predetermined one for said control means to control.

15. In combination with a picture-in-picture television receiver as claimed in claim 13, wherein said indicating means is an image associated with said main picture when said selection means is operated to select said main picture for said control means to control.

16. In combination with a picture-in-picture television receiver as claimed in claim 14, wherein said indicating means is an image associated with said main picture when said selection means is operated to select said main picture for said control means to control.

17. In combination with a picture-in-picture television receiver as claimed in claim 14, wherein said indicating means is a border on at least part of the edge of said picture-in-picture.

18. In combination with a picture-in-picture television receiver as claimed in claim 17, wherein said border is on the top and left side edges of said picture-in-picture.

19. In combination with a picture-in-picture television receiver as claimed in claim 18, wherein said indicating means is an image associated with said main picture when said selection means is operated to select said main picture for said control means to control.

* * * * *